(12) United States Patent
Novitschitsch

(10) Patent No.: US 6,457,547 B2
(45) Date of Patent: Oct. 1, 2002

(54) HOLDER FOR A LOUDSPEAKER TO BE MOUNTED IN A MOTOR VEHICLE AND METHOD FOR ITS MANUFACTURE

(75) Inventor: Peter Novitschitsch, Deizisau (DE)

(73) Assignee: Reitter & Schefenacker GmbH & Co. KG, Esslingen (DE)

(*) Notice: Subject to any disclaimer, the term of this patent is extended or adjusted under 35 U.S.C. 154(b) by 0 days.

(21) Appl. No.: 09/728,254

(22) Filed: Dec. 1, 2000

(30) Foreign Application Priority Data

Dec. 1, 1999 (DE) .......................................... 199 57 938

(51) Int. Cl.⁷ ................................................ H05K 5/00
(52) U.S. Cl. ........................................ 181/150; 181/141
(58) Field of Search ................................. 181/141, 150, 181/171, 172; 381/386, 389, 392, 395

(56) References Cited

U.S. PATENT DOCUMENTS

| 4,572,326 A | * | 2/1986 | Hutchins ..................... 181/150 |
| 4,653,607 A | * | 3/1987 | Bage ........................... 181/141 |
| 4,853,966 A | * | 8/1989 | Schrycki ...................... 181/150 |
| 5,532,437 A | * | 7/1996 | Simplicean et al. ......... 181/150 |

* cited by examiner

*Primary Examiner*—Khanh Dang
(74) *Attorney, Agent, or Firm*—Gudrun E. Huckett

(57) ABSTRACT

A holder for a loudspeaker to be mounted in a motor vehicle has a receptacle for receiving a loudspeaker. The receptacle has at least one support for supporting the receptacle on a part of the motor vehicle. At least one seal is arranged on the support and seals a mounting space provided within the motor vehicle for receiving the loudspeaker in the mounted position of the holder. The holder is manufactured by first injection-molding the receptacle and subsequently injection-molding the seal onto the receptacle.

12 Claims, 4 Drawing Sheets

HOLDER FOR A LOUDSPEAKER TO BE MOUNTED IN A MOTOR VEHICLE AND METHOD FOR ITS MANUFACTURE

BACKGROUND OF THE INVENTION

1. Field of the Invention

The invention relates to holder for a loudspeaker to be mounted in motor vehicles as well as a method for its manufacture.

2. Description of the Related Art

It is known to mount loudspeakers in motor vehicles, for example, in the door of the motor vehicle door. The holding element for the loudspeaker is the circumferential rim of the loudspeaker basket which is mounted in the mounting space of the door covering and is sealed by a seal relative to the rim of the door covering. When mounting the loudspeaker, great care must be taken in order not to damage the loudspeaker. Moreover, the circumferential rim of the loudspeaker must be sealed in a cumbersome way relative to the rim of the mounting opening of the door covering.

SUMMARY OF THE INVENTION

It is an object of the present invention to configure a holder of the aforementioned kind and to design the method of the aforementioned kind such that the loudspeaker can be mounted without problems and perfectly in the corresponding mounting space of the motor vehicle.

In accordance with the present invention, this is achieved with respect to the holder in that the holder comprises a receptacle for the loudspeaker which has at least one support with which the receptacle rests against a part of the motor vehicle and on which at least one seal is arranged which seals the mounting space of the loudspeaker.

In accordance with the present invention, this object is achieved with respect to the method in that the receptacle is injection-molded in a first step within an injection-molding machine and in that, subsequently, the seal is injection-molded onto the receptacle in a second step.

The holder according to the invention comprises a receptacle which receives and accommodates the loudspeaker. During mounting, the loudspeaker is therefore protected against damage by the receptacle. The receptacle rests with the support on a part of the motor vehicle on which part the holder according to the invention can be fastened in a simple way. The seal ensures that no moisture can penetrate. Moreover, the seal also provides a sound sealing action.

Pursuant to the method according to the invention, the holder is manufactured in two steps by injection molding. The receptacle is produced in a first method step. Preferably, the receptacle is advantageously made of a hard plastic material so that the receptacle of the holder according to the invention has the required strength. In a second method step, the soft component in the form of the seal is injection-molded onto the receptacle.

DESCRIPTION OF THE PREFERRED EMBODIMENTS

Figure 1:
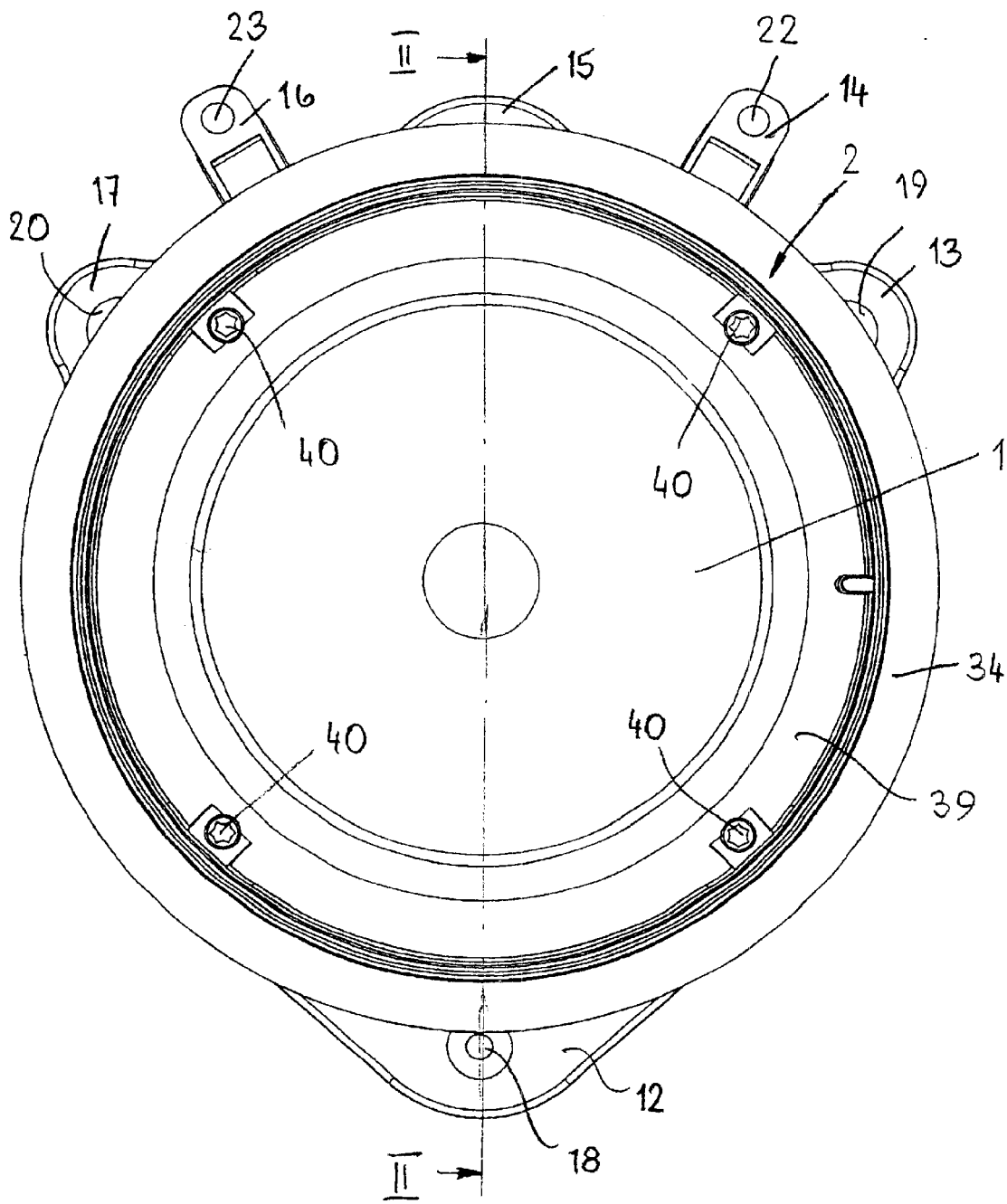
FIG. 1 is a plan view onto the loudspeaker holder according to the invention to be mounted in a motor vehicle, with the loudspeaker being mounted in the holder.

The holder or adaptor for a loudspeaker according to the invention is used to mount a loudspeaker 1 (FIG. 2) in a motor vehicle, for example, within the vehicle door, on the rear deck, or in other mounting spaces provided within the motor vehicle. The loudspeaker holder has a cup-shaped or basket-shaped receptacle 2 for the loudspeaker 1. The receptacle 2 has a bottom 3 which is planar and circular. It is advantageously thicker than the conical sidewall 4 of the receptacle 2 and can be provided with penetrations 42, for example, slots. The receptacle 2 widens in the direction toward the bottom 3. It is also possible to design the receptacle without a bottom.

Figure 2:
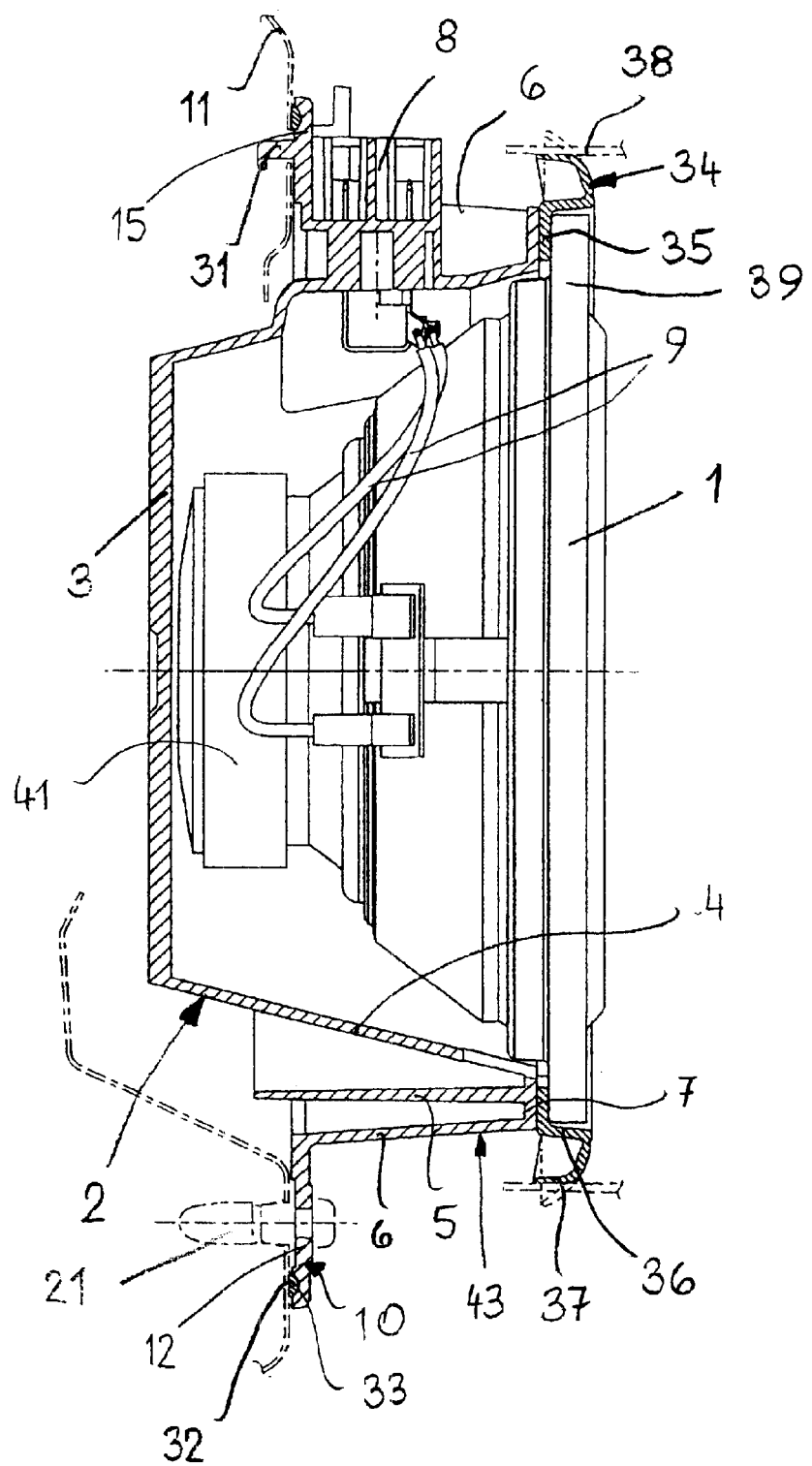
FIG. 2 is a sectional view along the line II—II of FIG. 1.

As illustrated in FIG. 2, in the interior of the receptacle 2, with respect to the mounting position, a wall 5 is provided which ends at a spacing from the bottom 3 of the receptacle 2. This wall is the lower surface of a water drain 43 which extends away from a support or rim 7 of the receptacle 2. The wall 5 is surrounded by a conical sidewall 6 which is shorter than the wall 5 and widens in the direction toward the bottom 3 of the receptacle 2 in a conical fashion (FIG. 2).

All three walls 4 through 6 adjoin the surrounding circumferentially extending planar support or rim 7 which extends, for example, in a plane parallel to the bottom 3 of the receptacle 2 or, in other words, extends perpendicularly to the axis of the receptacle 2. Depending on the mounting situation, the support or rim 7 can also extend slantedly relative to the axis of the receptacle 2. The cup-shaped or basket-shaped receptacle 2 with the bottom 3, the walls 4 to 6, and the rim 7 is advantageously of a monolithic construction. These parts are produced advantageously of a hard plastic material such as, for example, polycarbonate with glass fibers. The material for these parts 2 to 7 can also be polypropylene, polyacrylate, ABS (acrylonitrile butadiene styrene copolymer) and the like. By employing such hard plastic materials, the receptacle 2 has a high strength and protects thus the loudspeaker 1 inserted into it in an optimal way.

At the outer side of the receptacle 2 a plug connector 8 for electrical lines to be connected to the loudspeaker 1 is provided. Electrical lines 9 (FIG. 2) extend from the loudspeaker 1 to the plug connector 8 and are connected within the receptacle 2 to the plug connector 8 in a suitable manner.

Figure 3:
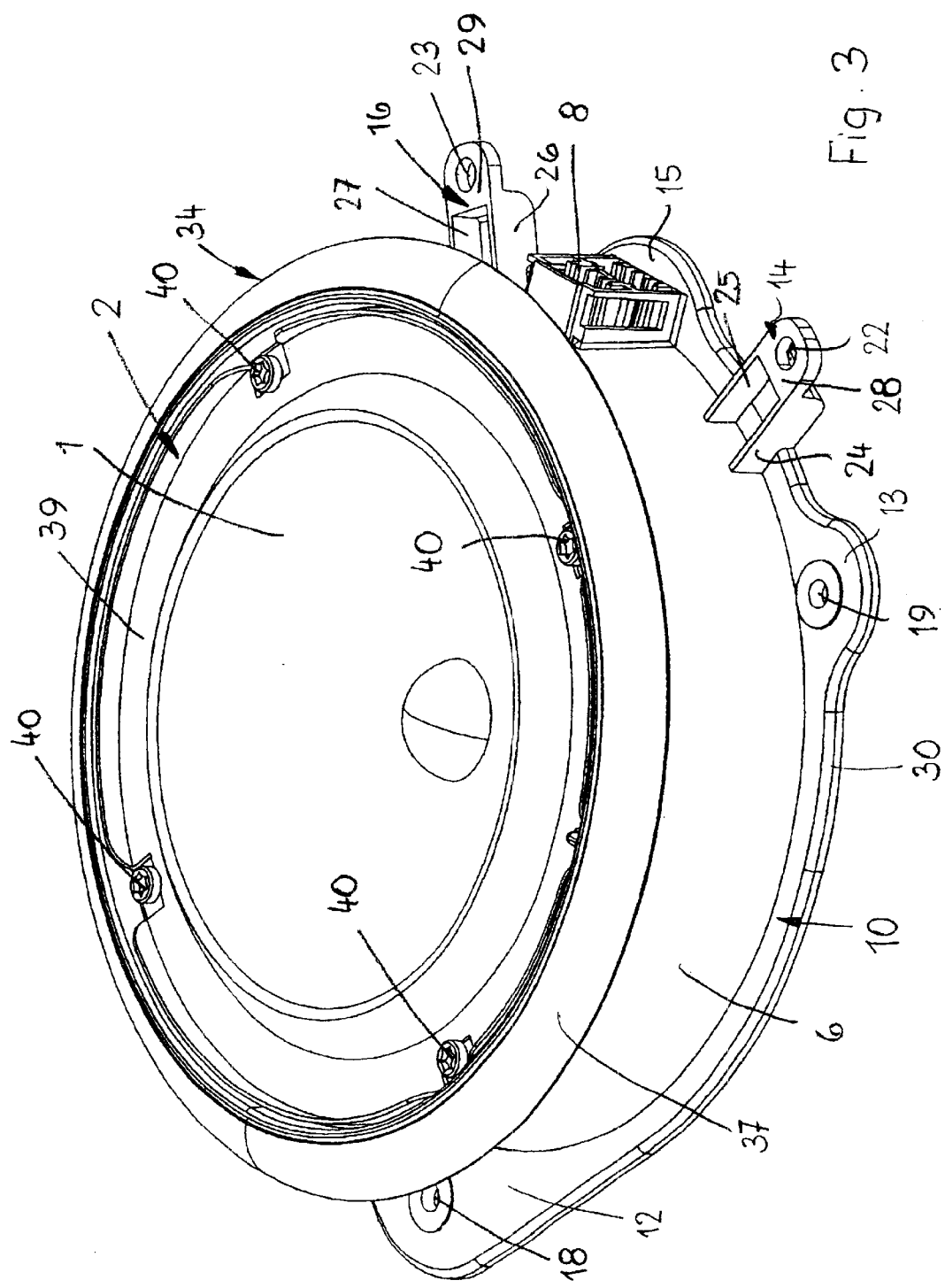
FIG. 3 is a perspective illustration of the loudspeaker holder according to the invention as illustrated in FIG. 1 with the loudspeaker being mounted in the holder.
Figure 4:
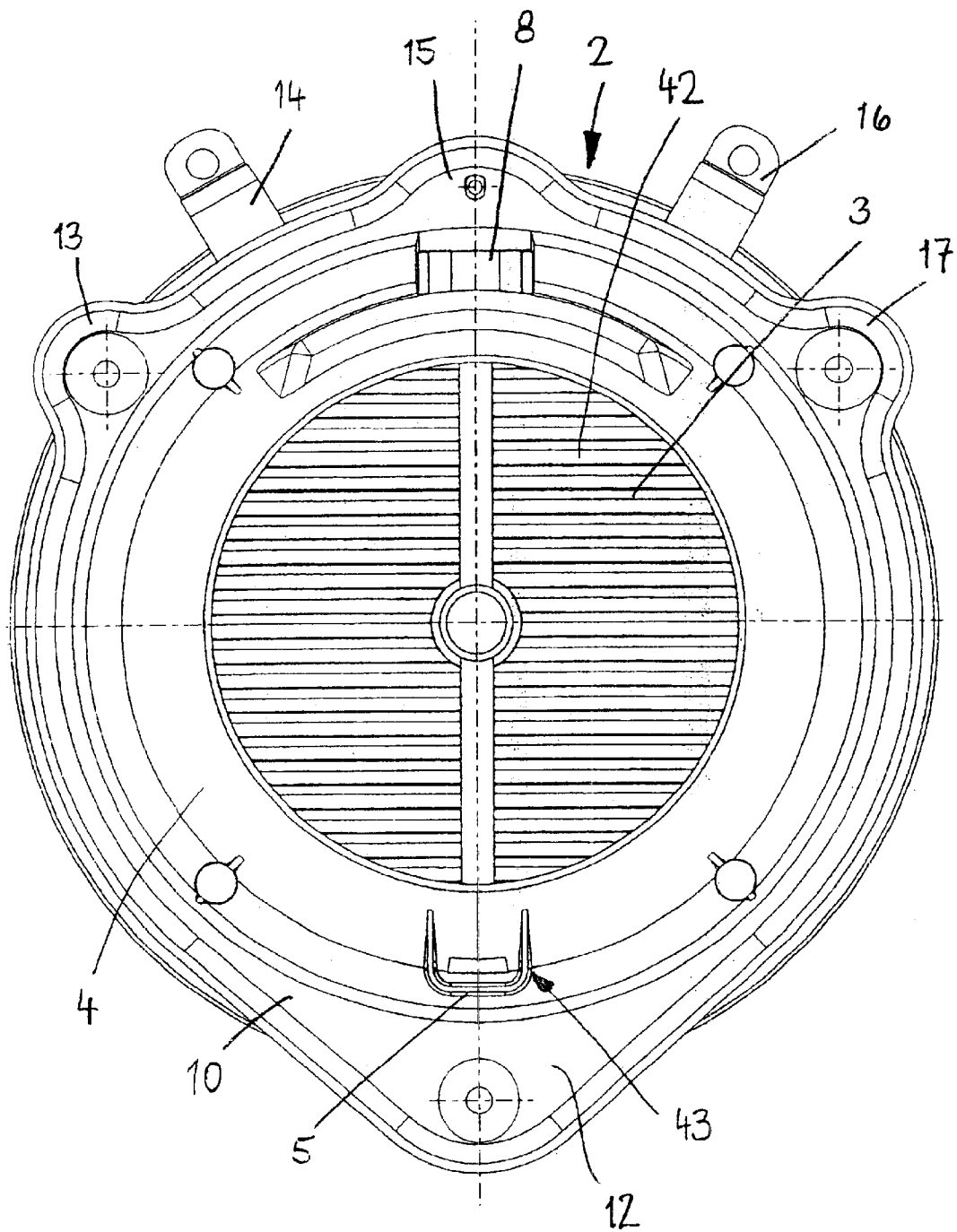
FIG. 4 is a bottom view of the holder according to the invention.

A circumferential or surrounding rim 10 projects from the outer sidewall 6. This rim 10 of the loudspeaker holder according to the invention rests against a car body part 11 (FIG. 2) of the motor vehicle. The part 11 of the car body in the illustrated embodiment is the inner sheet metal of the vehicle door, and the rim 10 of the loudspeaker holder rests on this sheet metal. The rim 10, as illustrated in FIGS. 1 and 3, is provided about its periphery with projecting tabs 12, 13, and 17. The surrounding or circumferential rim 10 can be positioned parallel to the bottom 3 of the receptacle 2 in the area between the bottom 3 and the upper rim or support 7. The tabs 12, 13 and 17 have a part-circular shape when viewed in a plan view and have through openings 18 to 20 for fastening elements 21 (FIG. 2) with which the loudspeaker holder is fastened on the car body part 11. Additional tabs 14 and 16 project radially farther outwardly than the aforementioned part-circular tabs 13, 15, 17 and are also provided with through openings 22, 23 for fastening elements, for example, for cables to be fastened. Depending on the mounting location, the arrangement and configuration of the tabs 12 through 17 can vary. The tabs 12, 13, and 17 are positioned in a common plane with the circumferentially extending rim 10. The tabs 14 through 16, as illustrated in FIG. 3, are substantially U-shaped in cross-section and have parallel legs 24, 25 and 26, 27 which are positioned perpendicularly on the rim 10 and adjoin the sidewall 6. At the free end, the legs 24, 25; 26, 27 are connected to one another by a horizontal stay 28, 29 in which the through opening 22, 23 is located. The legs 24, 25; 26, 27 extend, as illustrated in FIG. 3, past the peripheral edge 30 of the rim 10 so that the legs in their area projecting past the rim 10 are higher than in the area where they rest against the rim 10.

All of the tabs 12 through 17 are monolithic parts of the receptacle 2. Also, the housing of the plug connector 8 is advantageously formed as a monolithic part of the receptacle 2.

As can be seen in FIG. 2, hooks 31 can project from the rim 10 of the receptacle 2 on the side facing away from the upper rim or support 7. These hooks 31 engage matching openings in the car body part 11 and provide a detachment safety and as well as a mounting aid or centering aid for the receptacle 2.

The holder for the loudspeaker rests with the circumferential rim 10 of the receptacle 2 with interposition of at least one seal 32 on the car body part 11. The seal 32 extends advantageously about the circumference of the rim 10 and is advantageously foamed. The rim 10 is provided with a depression 33 for receiving the seal 32 at the side facing the part 11 of the car body. The depression 33 has advantageously a part-circular cross-section.

The circumferential seal 34 is positioned on the support 7 and provides a double function. It prevents, on the one hand, the penetration of moisture. On the other hand, it provides a sound sealing action for the loudspeaker 1.

In contrast to the hard (high strength) material of the receptacle, the seal 34 is advantageously comprised of a soft (yielding) plastic material, for example, TPE (thermoplastic elastomer). The seal 34 has an annular member 35 that rests with its entire surface area against the planar support 7. The annular member 35 has a transition into a conical part 36 at the radially outer edge. The conical part 36 widens radially outwardly and has a sealing lip 37 at its free end which projects radially outwardly from the free end of the conical part 36. The sealing lip 37, as illustrated in FIG. 2, is part-circular in cross-section and extends from the conical part 36 at a slant in the direction toward the rim 10 of the receptacle 2. FIG. 2 shows in dashed lines the position of the sealing lip 37 when the holder of the loudspeaker is not yet mounted and the sealing lip 37 is not yet deformed. The sealing lip 37 and also the conical part 36 project radially past the support 7 of the receptacle 2. In the mounted position, the sealing lip 37 rests with elastic deformation against the inner side of the door covering 38. Depending on the mounting location of the holder of the loudspeaker, instead of the door covering 38 any other lateral boundary or wall can be provided against which the sealing lip 37 of the seal 34 will rest with elastic deformation when the holder is mounted. In this way, a reliable sealing action is provided which prevents acoustic short-circuiting.

The loudspeaker 1 rests with a circumferential or surrounding annular flange 39 on the annular member 35 of the seal 34. Since the seal 34 has the conically outwardly extending wall portion 36, the loudspeaker 1 can be inserted in a simple way into the receptacle 2. The annular flange 39 of the loudspeaker 1 is secured in a manner known to a person skilled in the art by means of screws 40 on the support 7 with interposition of the annular member 35 of the seal 34. The loudspeaker magnet 41 is positioned at a small spacing relative to the bottom 3 of the receptacle 2 (FIG. 2).

The loudspeaker holder according to the invention is produced by injection molding. In an injection-molding tool with at least two cavities the receptacle 2 is first produced in one of the cavities in a first injection-molding step. The hard plastic material component is injected into the first cavity. After completion of this first injection-molding step, the receptacle 2, with the tool being open, is removed by a removal device and is inserted into a second cavity positioned laterally adjacent to the first cavity. This second cavity differs from the first cavity in that in the area of the seal 34 to be produced an enlarged volume is provided into which the softer plastic material component for the seal 34 is to be injected in a second injection-molding step. During this second injection-molding step, the hard plastic material component for producing the receptacle 2 of the next loudspeaker holder can be produced in the first cavity. Accordingly, the injection-molding tool is optimally used during the entire working cycle of the injection-molding tool, with the cycle phases being adjusted to one another. Of course, it is also possible to provide undercuts by employing slides within the injection-molding tool.

The injection-molding tool can also have more than two cavities, for example, four cavities, in order to increase the manufacturing capacity of the injection-molding machine. In this case, two loudspeaker holders according to the invention can be manufactured simultaneous in the described manner.

Finally, it is also possible to first produce in one cavity the receptacle 2 and to enlarge subsequently this same cavity for injection-molding the seal 34 onto the already injection-molded receptacle 2.

While specific embodiments of the invention have been shown and described in detail to illustrate the inventive principles, it will be understood that the invention may be embodied otherwise without departing from such principles.

What is claimed is:

1. A holder for a loudspeaker to be mounted in a motor vehicle, said holder comprising:

a receptacle (2) configured to receive the loudspeaker;

said receptacle (2) having at least one support (7) configured to support said receptacle (2) on a part of the motor vehicle;

at least one seal (34) arranged on said at least one support (7) and configured to seal a mounting space provided within the motor vehicle for receiving the loudspeaker;

wherein said at least one seal (34) has an annular member (35) positioned on said at least one support (7);

wherein said at least one seal (34) has a sealing lip (37) projecting radially outwardly from said annular member (35) and having a part-circular cross-section; and wherein said sealing lip (37) rests elastically deformed against a sidewall of the mounting space of the motor vehicle to seal the mounting space.

2. The holder according to claim 1, wherein said receptacle (2) is cup-shaped and has an open end.

3. The holder according to claim 2, wherein said at least one support (7) surrounds said open end.

4. The holder according to claim 3, wherein said at least one support (7) projects radially from said open end.

5. The holder according to claim 2, wherein said at least one seal (34) is a sealing ring circumferentially arranged about said receptacle (2).

6. The holder according to claim 1, wherein said sealing lip (37) projects radially outwardly past said at least one support (7).

7. The holder according to claim 1, wherein said receptacle (2) consists of hard plastic material.

8. The holder according to claim 7, wherein the hard plastic material is selected from the group consisting of polycarbonate containing glass fibers, polypropylene, polyacrylate, and acrylonitrile butadiene styrene copolymer.

9. The holder according to claim 1, wherein said at least one seal (34) consists of soft plastic material.

10. A method for manufacturing a holder according to claim 1, comprising the steps of:

a) injection-molding the receptacle; and
b) subsequently injection-molding the seal onto the receptacle so that the seal is fixed molded onto the receptacle.

11. The method according to claim 10, wherein the step a) is carried out in a first injection-molding cavity, further comprising the steps of removing the receptacle after step a) from the first injection-molding cavity and placing the receptacle into a second injection-molding cavity for carrying out step b).

12. The method according to claim 10, wherein the step a) is carried out in an injection-molding cavity, further comprising the step of enlarging the injection molding cavity for carrying out step b).

* * * * *